United States Patent [19]

Takada

[11] 4,141,410

[45] Feb. 27, 1979

[54] EVAPORATOR

[75] Inventor: Masahura Takada, Kobe, Japan

[73] Assignee: Sasakura Engineering Company, Limited, Osaka, Japan

[21] Appl. No.: 788,113

[22] Filed: Apr. 18, 1977

[30] Foreign Application Priority Data

Apr. 20, 1976 [JP] Japan .......................... 51-49638[U]

[51] Int. Cl.² .......................... F28B 9/08; F28B 9/02; F28F 25/10
[52] U.S. Cl. .................................. 165/113; 165/117; 165/146
[58] Field of Search ............... 165/117, 146, 174, 176, 165/111, 115, 112, 113; 122/483

[56] References Cited

U.S. PATENT DOCUMENTS

| 1,200,996 | 10/1916 | Söderlund et al. | 159/24 B |
|---|---|---|---|
| 1,435,612 | 11/1922 | Ljungström | 165/146 |
| 1,972,811 | 9/1934 | Wilkes | 165/117 |
| 2,619,453 | 11/1952 | Andersen | 165/113 |
| 3,389,059 | 6/1968 | Goeldner | 165/117 |
| 3,675,710 | 7/1972 | Ristow | 165/176 |
| 3,824,154 | 7/1974 | Takada et al. | 165/111 |

FOREIGN PATENT DOCUMENTS

| 244551 | 9/1910 | Fed. Rep. of Germany | 165/111 |
|---|---|---|---|
| 284413 | 2/1928 | United Kingdom | 165/117 |

Primary Examiner—Sheldon J. Richter
Attorney, Agent, or Firm—Merriam, Marshall & Bicknell

[57] ABSTRACT

A process for evaporation comprises the step of introducing high-temperature steam successively into separate bundles of horizontal heat-transfer tubes and spraying feed-liquid over the tubes. The number of the tubes in each bundle is smaller than that in the next lower bundle. The steam is first introduced into the tubes of the bottom bundle after cooled by subjection to condensate produced in the tubes of the middle bundle. An evaporator is also disclosed.

3 Claims, 4 Drawing Figures

EVAPORATOR

BACKGROUND OF THE INVENTION

The present invention relates to an evaporation process and an evaporator.

Generally, in a multiple-effect evaporator, high-temperature steam introduced from an external source to the highest-temperature effect as a heat medium goes through the heat-transfer tubes to evaporate brine introduced around the tubes. Vapor generated on the tubes is utilized as the heat medium for the next effect. The above function is repeated sequentially down to the lowest effect and finally the vapor is condensed in a condensor. Thus, in each effect, the steam or vapor is utilized for evaporation only once. If vapor generated in the lowest effect is drawn with a steam ejector without being condensed and is mixed with the driving steam for reuse as a heat medium for the multiple-effect evaporator, the water production ratio, i.e., the ratio of distillate out-put to steam input, will be increased.

The heat-tranfer coefficient of heat-transfer tubes of the evaporator is improved by arranging more bundles of the tubes in an evaporation chamber so that vapor will flow through one tube bundle after another at a high velocity uniformly in every tube, although such arrangement costs a little higher.

There has conventionally been an evaporator of the vapor compression type having two separate bundles of horizontal heat-transfer tubes. Feed-liquid is sprayed over the tubes and the evaporated portion of the liquid is compressed by an engine-driven compressor before it is fed into the upper bundle of tubes for heat-exchange. Fluid in the upper tubes turns into the lower tubes from which condensate and non-condensible gases are discharged. The outer surface of the lower tubes are subjected to the high-temperature sprayed liquid as heated on the upper tubes, so that non-condensible gases passing through the lower tubes will not be fully cooled and must be discharged together with a large amount of steam. This increases the amount of gas discharge, necessitating a large-size gas extractor or a separate or extra vent condenser to minimize thermal losses.

These undesirable subjects will be further improved by simultaneously effecting the arrangement of separate bundles of heat-transfer tubes and the introduction of subcooled feed-liquid onto the top bundle of heat transfer tubes, then introducing high-pressure steam mixed with low-pressure vapor into the bottom bundle of heat-transfer tubes. However, if the mixed vapor is too hot, scales may form on the heat-transfer tubes. Generally, as steam of high-temperature and high-pressure adiabatically expands through a steam ejector, it becomes superheated steam of low-pressure and high-temperature, which, because it is too hot, should not be used for evaporation as it is even if mixed with vapor from the lowest-temperature effect.

SUMMARY OF THE INVENTION

It is a major object of the present invention to provide a process for evaporation and an evaporator for scale-free operation at a high thermal effciency and using a small-size gas extractor.

BRIEF DESCRIPTION OF THE DRAWINGS

The present invention will be better understood from the following description of a specific but non-restrictive embodiment by reference to the accompanying drawings wherein.

DETAILED DESCRIPTION OF THE INVENTION

Figure 1:
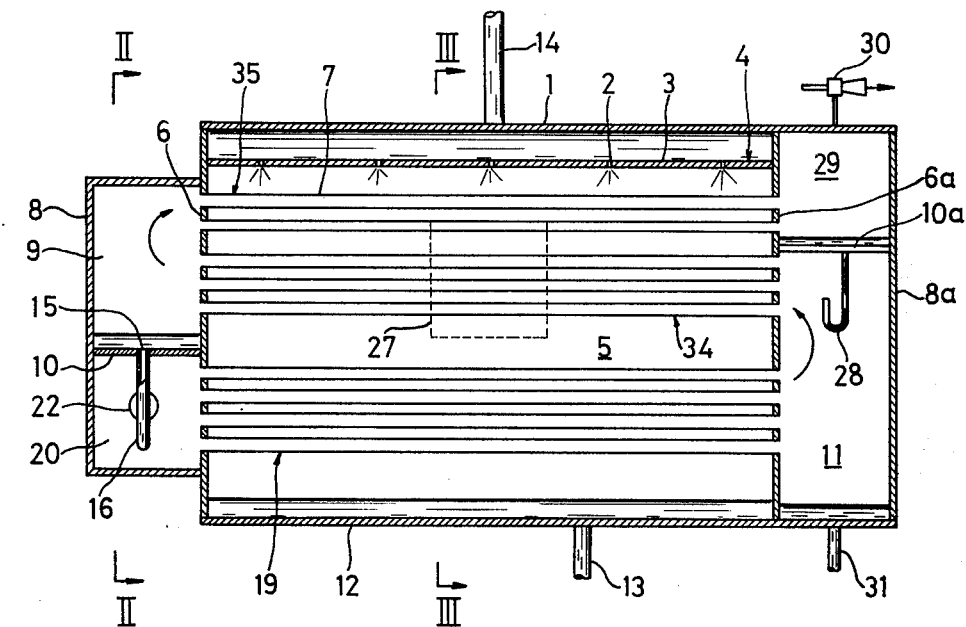
FIG. 1 is an elevational section of the evaporator.
Figure 2:
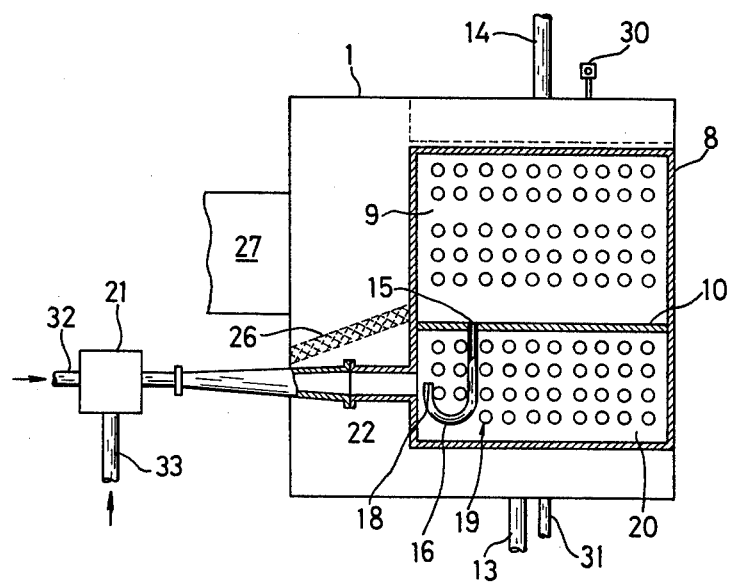
FIG. 2 is a section viewed on the line II—II of FIG. 1.

In an upper zone within a casing 1 of an evaporator is provided a plate 3 having a multiplicity of small holes or orifices 2 to form a liquid spray means generally designated at 4 over an evaporation chamber 5, wherein separate bundles of substantially horizontal heat-transfer tubes 7 extend between tube plates 6 and 6a below orifices 2. The outer sides of both tube plates 6 and 6a are covered by a first header 8 and a second header 8a. The interior of the headers is partitioned by respective plates or diaphragms 10 and 10a to define some, in this instance, three separate or individual bundles 19, 34 and 35 of tubes 7. Plate 10 is positioned in header 8 between bottom bundle 19 and middle bundle 34, and plate 10a in header 8a between middle bundle 34 and top bundle 35. It is advantageous that the number of tubes 7 of each separate bundle be less than that of the next lower bundle so that the fluid flow rate will not be lowered within the upper tubes as the volume of fluid therewithin gets less with condensation of fluid itself. A space on the floor of chamber 5 is uitlized as a concentrated liquid collector 12 which communicates with a takeout pipe 13. Spray means 4 is connected to a feed-liquid pipe 14.

Plate 10 is bored with at least one opening 15 therethrough from which a condensate downflow pipe 16 extends like the letter U down into an inlet or first head chamber 20 for bottom tube bundle 19, so that condensate collected in an upper or third head chamber 9 will fall by gravity into head chamber 20 through pipe 16. The upturned end 18 of pipe 16 opens counter to an outlet port 22 of a steam ejector 21 coupled to header 20 so that the condensate falling through pipe 16 will be sprayed by jet steam ejected from ejector 21. Pipe 16 is not limited to the U shape but may be of any shape with which the pipe 16 opens at one end in the steam jet from ejector 21 while allowing a certain amount of condensate to be kept constantly on diaphragm 10 so that the vapor or steam in header 20 will not be released directly into upper header 9 by pressure difference between the two headers. Condensate in a curved portion of pipe 16 prevents such release of steam.

Figure 3:
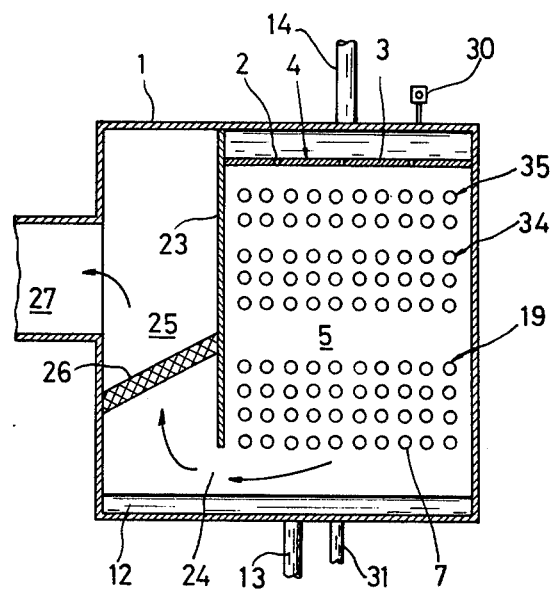
FIG. 3 is a section viewed on the line III—III of FIG. 1.
Figure 4:
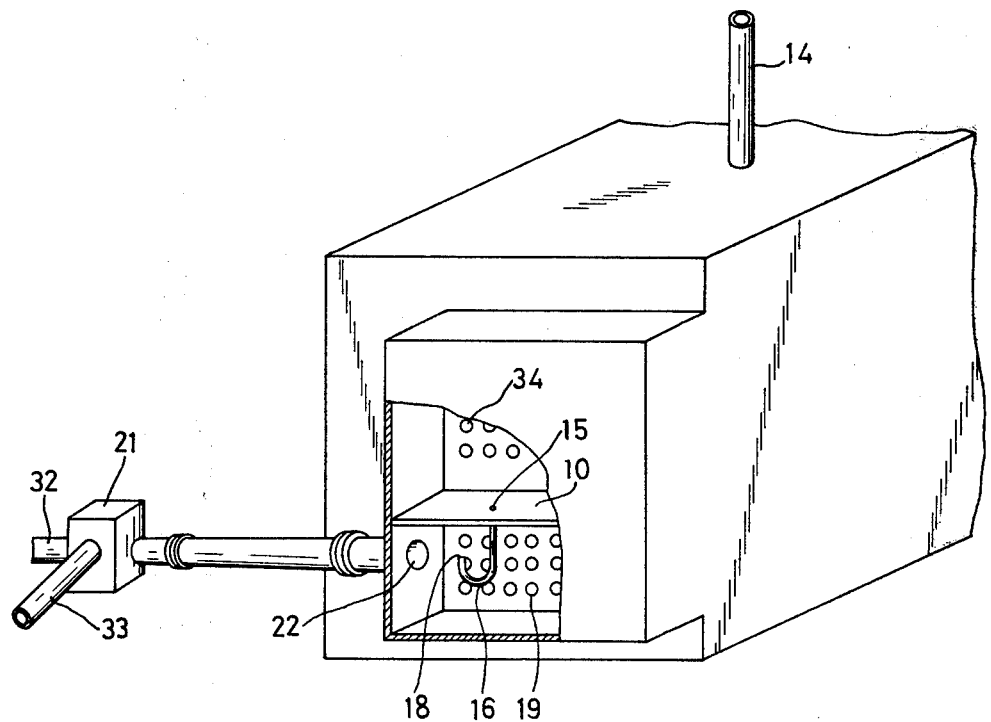
FIG. 4 is a perspective view partially broken away of the evaporator.

A vertical partition 23 as shown in FIG. 3 defines a vapor passage 25 along the partition plate 23 in casing 1 with a clearance 24 thereunder, through which the evaporation chamber 5 communicates with passageway 25 which, in turn, communicates with a vapor exit 27. A mist separator 26 is interposed in passage 25.

Another condensate fall pipe 28 similar to pipe 16 opens at one end in plate 10a and at the other end in a lower or second head chamber 11. An outlet or final head chamber 29 for top tube bundle 35 is provided with a gas extractor 30, such as a steam ejector. When the pressure within tubes 7 is kept above the atmosphere, a simple hole through the outer wall of head chamber 29 may replace such a gas extractor for discharging non-condensible gases.

Feed-liquid, such as seawater introduced through the pipe 14 is sprayed from orifices 2 uniformly over heat-transfer tubes 7. A high-pressure steam as a heating and driving medium is fed through a pipe 32 into ejector 21. Low-pressure vapor discharged from duct 27 or, in the case of a multi-effect evaporator, generated in the lowest-temperature effect (not shown), is drawn through a pipe 33 and mixed with said high-pressure steam. The resultant mixed superheated vapor or steam is ejected into the inlet head chamber 20 through outlet port 22.

On the other hand, condensate produced in the heat-transfer tubes of middle bundle 34 flows therein with the steam flow and collects on plate 10. The condensate then falls through pipe 16 and overflows from the exit 18, where it is converted into a mist by said high-velocity mixed steam from the discharge port 22. The mist is diffused in the inlet header 20 and distributed to wet the internal surfaces of heat-transfer tubes 19. In this manner, said heat-transfer tubes are prevented from being heated beyond the saturation temperature being equivalent to the pressure of the mixed steam, with the result that, virtually, the steam is desuperheated to the temperature of saturated steam.

The thus desuperheated steam is heat-exchanged with the feed liquid sprayed over the tubes of bottom bundle 19, and a portion of the steam is condensed to collect on the bottom of second head chamber 11, from which it is drained through the pipe 31. The uncondensed steam will enter middle tubes 34 wherein a further portion of the steam is condensed and collected on diaphragm 10. The condensate then falls through pipe 16 and mixed with the steam mixture form the ejector 21. Yet uncondensed steam will enter top tubes 35 wherein a still further portion thereof is condensed and collects on plate 10a, from which it falls through pipe 28 and added to the condensate produced in the bottom tubes 19 before it is removed from the pipe 31. The non-condensable gases are released into the atmosphere by gas extractor 30. The vapor produced from the feed liquid by heat exchange in chamber 5 flows through the clearance 24 and passage 25, with its droplets removed by mist separator 26, into exit 27. In a multi-effect evaporator, the vapor then enters the next effect to be a heat medium therefor. In a single-effect evaporator, the vapor then is drawn through pipe 33 and reheated by ejector 21. The concentrated liquid collected on the floor of chamber 5 is discharged through pipe 13 and may be fed to the next effect in a multi-effect evaporator.

As described hereinabove in detail, the heating steam is fed into the heat-transfer tubes of the bottom bundle and finally into the tubes of the top bundle onto which cold feed-liquid at a temperature below evaporation point, named subcooled liquid is sprayed and falls successively onto the lower tube bundles. Thus, the steam containing non-condensible gases passing through the top tubes is heat-exchanged with the coldest feed-liquid and cooled sufficiently to minimize the ratio in amount of steam to the non-condensible gases contained in the steam. Accordingly, almost only the gases and very little steam are discharged from the evaporator so that a small-size gas extractor will suffice for the discharge or, when no such extractor is used, heat loss of the discharge steam will be prevented without providing a vent condenser.

The number of the heat-transfer tubes of an upper bundle is smaller so that the flow of fluid in the tubes will not be slowed down as the steam is decreased in volume with condensation therein while it flows from the bottom tubes up to the upper tubes. This prevents the heat-transfer coefficiency from being lowered due to the slow rate of flow of the fluid, thereby improving the heat-transfer coefficiency in each tube bundle. Exit 18 of the condensate downflow pipe 16 extending from plate 10 is located counter to the outlet port 22 of the ejector 21, so that the high-velocity superheated steam discharged from said ejector atomizes the condensate over-flowing the exit 18. A mixture of the steam and atomized condensate enters the heat-transfer tubes to heat the feed liquid on the external surfaces of the tubes, thereby preventing scaling as the result of evaporation so as to prolong continuous operation. Because of the lowermost position of the first tube bundle, the condensate on plate 10 falls by gravity to the vicinity of the discharge port of the steam ejector without a pump. And the downflow pipe 16 need not have any specially devised outlet means but the exit 18 is only designed to open adjacently to the discharge port 22 of the steam ejector. All these features lead to a simplified construction which is trouble-free. Since the flow velocity of steam at the ejector discharge port is high, the atomization of condensate in the first header 20 is made uniform and yields vortex flows so that, even when the number of heat-transfer tubes is large, water droplets of the mixed steam and atomized condensate can uniformly wet the inner wall of the tubes which will not be superheated, thus preventing scaling.

Thus, the present invention provides a plurality of separate bundles of heat-transfer tubes so as to improve thermal efficiency in heat-exchange at the tubes and to minimize the gas extractor in size. The invention also provides the simple mechanism for cooling the heat-transfer tubes by the aid of the steam ejector so as to prevent scales which are the worst obstacle to operation of evaporators.

What is claimed is:

1. An evaporator comprising
   a casing,
   an evaporation chamber defined within said casing and having thereover feed liquid spray means,
   first and second headers on the outside of said evaporation chamber,
   plural bundles of substantially horizontal heat-transfer tubes extending within said evaporation chamber between said headers and so arranged that steam will flow through said tubes successively from one of said bundles to the next upper bundle,
   the number of said tubes in each bundle being smaller than that in the next lower bundle,
   concentrated liquid collector means at the bottom of said evaporation chamber,
   at least one plate positioned in said first header between adjacent two of said tube bundles and formed with at least one opening therethrough,
   a pipe extending from said opening down into a first head chamber defined in said first header under said plate at the inlet of the bottom tube bundle, through which pipe condensate collected on said plate will fall by gravity into said first head chamber, and
   means for introducing superheated steam into said first head chamber,
   said pipe opening in said first head chamber adjacent the opening of said means for introducing superheated steam.

2. An evaporator claimed in claim 1 further comprising an extractor for extracting and discharging uncondensed steam and gases to outside from the outlet of the top tube bundle.

3. An evaporator claimed in claim 1, wherein said plate in said first header is positioned between said bottom tube bundle and the next upper tube bundle and another plate is positioned in said second header between said top tube bundle and the next lower tube bundle.

* * * * *